UNITED STATES PATENT OFFICE.

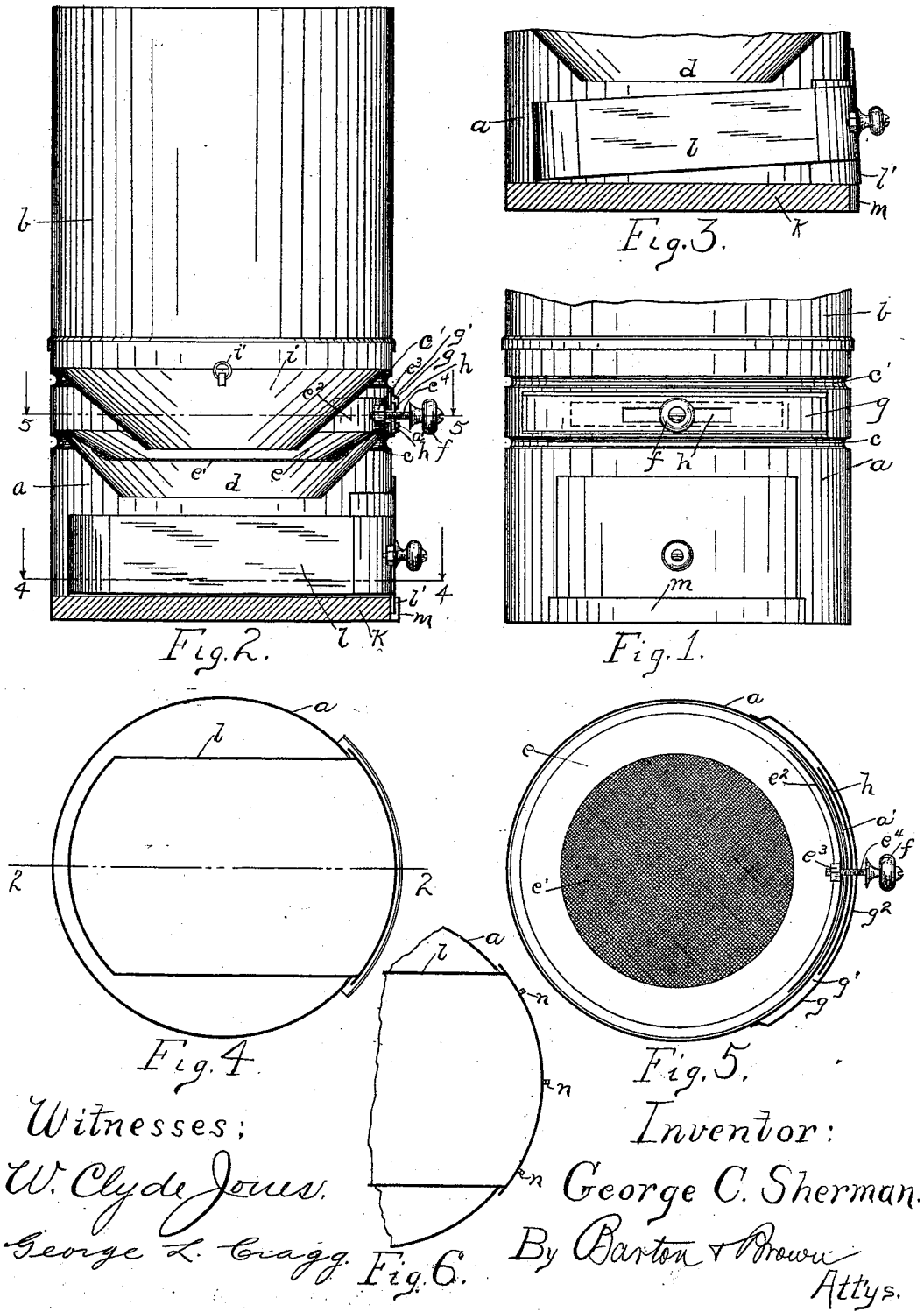

GEORGE C. SHERMAN, OF CHICAGO, ILLINOIS, ASSIGNOR TO WILLIS M. SHERMAN AND FRED H. BUTLER, OF SAME PLACE.

FLOUR BIN AND SIEVE.

SPECIFICATION forming part of Letters Patent No. 508,439, dated November 14, 1893.

Application filed December 6, 1892. Serial No. 454,231. (No model.)

*To all whom it may concern:*

Be it known that I, GEORGE C. SHERMAN, a citizen of the United States, residing at Chicago, in the county of Cook and State of Illinois, have invented a certain new and useful Improvement in Flour Bins and Sieves, (Case No. 3,) of which the following is a full, clear, concise, and exact description, reference being had to the accompanying drawings, forming a part of this specification.

My invention relates to flour bins, and more particularly to certain improvements in a flour bin described in an application for Letters Patent, Serial No. 441,245, filed by me January 26, 1892.

The object of my invention is to improve upon the construction shown therein.

The application, above referred to, relates to a combined flour bin and sieve, in which a circular frame carrying the sieve fits in a swage in the sides of the bin, and is adapted to be given a rocking motion in a horizontal plane while performing its function of sifting the flour, which motion is produced through the agency of a handle attached to the frame of the sieve and extending through and working in a horizontal slot in the side of the bin. Above the sieve is an annular shelf with inwardly and downwardly sloping sides, which, while directing the flour to the sieve, serves to remove the weight of the bulk of the flour from the sieve. Beneath the sieve is a funnel shaped rim adapted to direct the flour, after passing through the sieve to a box beneath, the box being removable through an opening in the side of the bin closed by a hinged door.

My present invention consists, first, in making the sieve and the annular shelf removable; second, in a construction whereby all possibility of escape of the flour through the slot in which the handle moves is prevented; third, in replacing the hinged door and the box by a drawer provided with a face larger than the opening in the side of the bin, the lower end of the face extending below the bottom of the drawer and adapted to hold the drawer in a closed position by engaging with an upward projection upon the bin.

My invention will be more readily understood by reference to the accompanying drawings, in which—

Figure 1 is a front partial view of the bin. Fig. 2 is sectional view of the bin upon a plane passing through line 2—2, Fig. 4. Fig. 3 is a partial sectional view of the bin upon a plane passing through line 2—2 of Fig. 4, showing the drawer raised so that its downward extension is raised above the upward projection upon the bin. Fig. 4 is a sectional view of the bin upon a plane passing through line 4—4 of Fig. 2. Fig. 5 is a sectional view of the bin upon a plane passing through line 5—5 of Fig. 2, the annular shelf above the sieve having been removed. Fig. 6 is a partial view similar to that shown in Fig. 4 the continuous upward projection in front of the bin being replaced by three pins.

Like letters refer to like parts in the several figures.

The bin may be made in two parts, a lower cylindrical part $a$ containing the sieve and its accessories, and an upper cylindrical part $b$ adapted to fit upon the upper end of the part $a$. Upon the interior of the part $a$ is provided an inward projection or ridge $c$ extending entirely around the bin, and is preferably made by rolling a ridge in the metal plate of which the rim is made. To the upper surface of the projection $c$ is soldered, or otherwise secured, the horizontally extending flange of the directing rim $d$, the upper surface of said flange being preferably flat and lying in a horizontal plane to form a bearing surface for a similar flange provided upon the rim $e$. The rim $e$ is provided with sloping sides and to its lower end is secured the sieve $e'$. To the upper surface of the flange of the rim $e$ is secured an upwardly extending plate $e^2$ bent into an arc of a circle concentric with the inner surface of the bin. To the inner side of said plate is soldered a nut $e^3$, into which a screw $e^4$ forming a support for the knob $f$ is adapted to screw; the knob and the screw forming the handle by which the sieve may be moved back and forth. The screw $e^4$ extends through a hole provided in the plate $e^2$ and through a slot $a'$ in the side of the bin. Upon the exterior of the bin is secured by its edges a strip $g$, its central portion being at a distance from the bin whereby a receptacle $g'$ is formed between the strip $g$ and the outer surface of the bin. Within this receptacle is placed a strip or plate $h$ bent into an arc of a circle concentric with the side of the bin and provided with a hole at its center, through which the screw $e^4$ passes. The strip $g$ is provided with a slot $g^2$ corresponding in position to the slot $a'$ in the bin. Thus, when the handle is moved in either direction the screw $e^4$ moves back and forth in the slots $a'$ and $g^2$ carrying with it the plates $e^2$ and $h$; these plates being slightly greater in length than double the length of the slots the slots will always be covered thereby, the plate $e^2$ covering the slot $a'$ and the plate $h$ covering the slot $g^2$ and furnishing a double security against the escape of flour or dust. Thus the sloping sides of the rim $e$ and the plates $e^2$ and $h$ all conduce to the same end, that of effectually preventing the passage of the flour anywhere else than through the sieve $e'$.

Above the sieve is a second inwardly projecting ridge $c'$ upon the bin extending around the same, this ridge being adapted to support the annular shelf $i$ which is provided with a flange adapted to engage with the ridge. The shelf $i$ may be provided with a ring handle $i'$ by means of which it may be removed from the bin. The sieve may also be removed by unscrewing the screw $e^4$ when the sieve will be free to be withdrawn.

In the bottom of the bin I provide a drawer $l$, the opening in the bin being somewhat greater in height than is the depth of the box portion of the drawer. The face of the drawer extends above the top of the box portion and is of sufficient area to completely cover the opening in the bin when the drawer is in its closed position. The face also extends below the bottom of the box portion, thus forming a downward extension $l'$. In the bottom of the bin is placed a base $k$, preferably of wood, and of such a thickness that its upper surface is flush with the lower edge of the opening in the bin.

Below the opening in the bin is secured a metal strip $m$ of right angular cross section in such a manner that its vertical side will extend above the lower edge of the downward extension $l'$ upon the face of the drawer, so that, when the drawer is in its closed position, the downward extension $l'$ will lie between the bin and the vertical side of the strip $m$ and serve to hold the drawer in a closed position. Instead of a continuous strip $m$, one or more pins $n$ $n$ provided with heads having vertical extensions may be employed, as shown in Fig. 6.

It is evident that my invention is susceptible of many modifications, and I do not, therefore, wish to be limited to the details of construction shown.

Having described my invention, what I claim as new, and desire to secure by Letters Patent, is—

1. In a combined flour bin and sieve, the combination with the ridge $c$ of the directing rim $d$ and the sieve rim $e$ supported thereon, a vertical plate $e^2$ secured to said rim $e$, nut $e^3$ secured to said plate $e^2$, screw $e^4$ adapted to screw therein and to form a handle for the manipulation of the sieve, ridge $c'$ above said ridge $c$, an annular shelf with sloping sides supported thereon, and drawer $l$, substantially as described.

2. In a combined flour bin and sieve, the combination with the ridges $c$ and $c'$ in the sides of the bin, of a directing rim supported upon the lower of said ridges, a sieve rim whose diameter is less than the inner diameter of the upper ridge $c'$ and adapted to be supported by said directing rim, a detachable handle for said sieve rim, and an annular shelf with sloping sides supported upon the upper of said ridges; whereby the annular shelf and the sieve rim may be removed from the bin, substantially as described.

3. In a combined flour bin and sieve, the combination with the directing rim supported by a ridge in the sides of the bin, of a sieve rim supported in said bin above said directing rim, and provided with a vertical plate, a handle secured to said plate and passing through a slot in said bin, a plate carried upon said handle in front of said slot and adapted to cover the same, and an annular shelf provided with sloping sides supported above said sieve, substantially as described.

4. In a combined flour bin and sieve, the combination with the directing rim supported in the bin, of a sieve rim supported above said directing rim and provided with a vertical plate, a handle secured to said plate and extending through a slot in said bin, a plate carried upon said handle in front of said slot and adapted to cover the same, a casing exterior to the plate carried upon the handle, and provided with a slot registering with the slot in the bin, and an annular shelf with sloping sides supported above said sieve rim, substantially as described.

5. In a combined flour bin and sieve, the combination with a sieve, of a handle secured thereto and extending through a slot in said bin, a plate carried upon said handle in front of said slot and adapted to cover the same, and a casing exterior to said plate, said casing being provided with a slot registering with the slot in the bin, substantially as described.

In witness whereof I hereunto subscribe my name this 2d day of December, A. D. 1892.

GEORGE C. SHERMAN.

Witnesses:
W. CLYDE JONES,
HARRIET G. TEMPLETON.